United States Patent [19]

Shimizu et al.

[11] Patent Number: 4,604,260
[45] Date of Patent: Aug. 5, 1986

[54] METHOD OF PRODUCING ELECTROLYTIC CAPACITOR WITH AL-TI ANODE BODY

[75] Inventors: Shigeaki Shimizu; Yoshio Arai, both of Tokyo, Japan

[73] Assignee: NEC Corporation, Tokyo, Japan

[21] Appl. No.: 736,944

[22] Filed: May 22, 1985

[30] Foreign Application Priority Data

May 22, 1984 [JP] Japan .................... 59-102880

[51] Int. Cl.[4] .............................. B22F 1/00
[52] U.S. Cl. .......................... 419/2; 29/570; 75/232; 75/235; 361/321; 361/433; 419/19; 419/23; 419/29; 419/38; 419/53; 419/54; 419/55; 419/57; 419/60
[58] Field of Search ............. 419/23, 2, 53, 19, 35, 419/54, 29, 38, 55, 57, 60; 361/433, 321; 29/570; 75/232, 235

[56] References Cited

U.S. PATENT DOCUMENTS

| | | | |
|---|---|---|---|
| 4,002,473 | 1/1977 | Klein | 419/2 |
| 4,331,477 | 5/1982 | Kubo et al. | 419/2 |
| 4,432,935 | 2/1984 | Kubo et al. | 419/2 |
| 4,468,719 | 8/1984 | Shimizu et al. | 75/249 |
| 4,517,727 | 5/1985 | Shimizu et al. | 361/433 |

Primary Examiner—Stephen J. Lechert, Jr.
Attorney, Agent, or Firm—Laff, Whitesel, Conte & Saret

[57] ABSTRACT

A solid electrolytic capacitor is made with an Aluminum-titanium body. Aluminum and titanium powders are press-molded into a body which is then heated sufficiently to provide a porous Al-Ti alloy with an oxide layer. Next, the body is heated in an atmosphere containing at least 0.1% by volume of oxygen at a temperature in the range of about 500°–700° C. Thereafter, a layer of manganese dioxide is formed over the oxide layer and a cathode electrode layer is then formed over the manganese dioxide layer.

12 Claims, 5 Drawing Figures

METHOD OF PRODUCING ELECTROLYTIC CAPACITOR WITH AL-TI ANODE BODY

BACKGROUND OF THE INVENTION

The present invention relates to a method of producing an electrolytic capacitor with an aluminum-titanium alloy anode body.

A porous sintered body for an electrolytic capacitor using an aluminum-titanium alloy as the anode material is disclosed in U.S. Pat. No. 4,331,477, which is owned by the assignee of the present invention, the patent having issued on May 25, 1982. A porous Al-Ti alloy body can be obtained by the following steps, for example. First, aluminum and either titanium or titanium hydride (TiHz) in the form of powder in the micron order are sufficiently mixed. The mixed powder is then press-molded with a lead wire embedded in it. The mold is sintered in a vacuum of $1 \times 10^{-6}$ mm Hg, at a temperature of 1,000° to 1,100° C., for 1 to 3 hours, to obtain an alloy porous sintered body. An Al-Ti alloy reaction occurs during sintering. Aluminum is exclusively diffused into and absorbed by titanium, so that the portions where aluminum has been previously present become and remain porous, thereby providing the porous alloy body. The method of providing an electrolytic capacitor with Al-Ti alloy anode is disclosed in the copending application Ser. No. 509,153 filed on June 28, 1983.

The Al-Ti alloy having the excellent capacitor characteristics has also the characterizing feature that a porous body can be easily obtained having a large specific surface area.

In order to make a solid electrolytic capacitor, the Al-Ti alloy is subjected to an anodic oxidation to form an oxide film by using an aqueous solution of phosphoric acid. Thereafter, a manganese dioxide ($MnO_2$) layer is formed by a thermal decomposition of manganese nitrate. Then graphite and silver-paste layers are formed on the $MnO_2$ layer by a process which is essentially the same as the process used for forming conventional Ta capacitors.

The temperature of the heat treatment of the thermal decomposition of the manganese nitrate generally ranges between 200° C. and 250° C. At such a high temperature, the oxide film is thermally deteriorated.

It was found that the oxide film was deteriorated much more remarkably on the thermal decomposition of manganese nitrate than it was deteriorated in the case of a Ta capacitor. It is thought that this deterioration occurs because both Ti and Al essentially are far more chemically active than Ta.

When the oxide film is thermally deteriorated, dielectric characteristics such as the dielectric loss and the temperature coefficient of the electrostatic capacitance are increased.

SUMMARY OF THE INVENTION

An object of the invention is to provide a method of producing an electrolytic capacitor having an anode body made of an Al-Ti alloy, the capacitor being capable of remarkably reducing the dielectric loss of the anodic oxide film and the temperature coefficient of the electrostatic capacitance.

According to the present invention, the dielectric loss of the oxide film and the temperature coefficient of the electrostatic capacitance are largely reduced by subjecting the Al-Ti alloy to a heat treatment conducted in an oxygen-containing atmosphere after the anodic oxidation.

The content of oxygen gas in the atmosphere used is favorably within 0.1 to 100 volume % and the heat treatment is favorably conducted at a temperature of 500° C. to 700° C. for a time period in the range of 30 minutes to 3 hours.

DETAILED DESCRIPTION OF THE PREFERRED EMBODIMENTS

Figure 1:
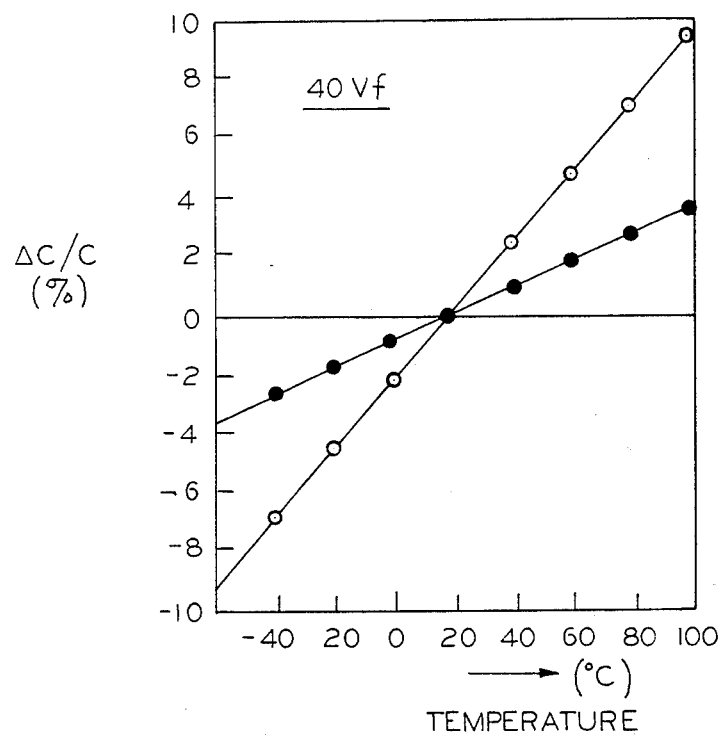
FIGS. 1, 2 and 3 are graphs showing temperature characteristics of electrostatic capacitances of solid samples measured at 120 Hz.

Powders of titanium hydride and aluminum having a mean particle size of 3 μm were mixed with each other at the Al content of 54 atom % and Ti content of 46 atom %. The mixture was press-molded into a cylindrical form. The press-molded cylinder of the powder mixture was then fired and sintered by being held in a vacuum atmosphere for two hours at 1070° C., thus forming porous anode bodies of an Al-Ti alloy. The Al-Ti alloy had a diameter of about 2.5 mm and a height of 2 mm.

The porous Al-Ti alloy anode bodies were subjected to anodic oxidation conducted in a 0.1 volume % of phosphoric acid, at varying formation voltages of 40 V, 60 V, 80 V, 100 V and 120 V, thus preparing five kinds of samples. These samples were then subjected to a heat treatment which was conducted for one hour at varying temperatures shown in "Heat Treatment After Anodic Oxidation", in Table 1.

The measurement of the dielectric loss (tan $\delta_f$) of the anodic oxide film at 120 Hz was conducted for the samples of no heat treatment. The samples were subjected to heat treatment in the atmospheric air, the result of this treatment is shown in "tan $\delta_f$(before solid treatment)", in Table 1. In each case, twenty pieces of samples were used. The resulting mean values are shown in Table 1. The measurement was conducted in a 30 volume % sulfuric acid. The electrostatic capacitances (at 120 Hz) were almost the same as the capacitances of those samples which had no heat treatment. More specifically, electrostatic capacitances of approximately 12.6 μF, 8.3 μF, 6.2 μF, 4.9 μF and 4.1 μF were confirmed for the samples prepared at the anodic oxidation voltages of 40 V, 60 V, 80 V, 100 V and 120, respectively.

TABLE 1

| Formation Voltage (Vf) | Heat Treatment After Anodic Oxidation | tan $\delta_f$(%) (before solid Treatment) | tan $\delta_f$(%) (after solid Treatment) | tan $\delta_{120}$(%) (after solid Treatment) |
|---|---|---|---|---|
| 40 | None | 1.4 | 1.8 | 3.2 |
|  | 550° C. 1 Hr. | 0.3 | 0.3 | 1.7 |
| 60 | None | 1.3 | 1.7 | 2.9 |
|  | 575° C. 1 Hr. | 0.25 | 0.25 | 1.5 |
| 80 | None | 1.2 | 1.6 | 2.7 |

TABLE 1-continued

| Formation Voltage (Vf) | Heat Treatment After Anodic Oxidation | tan δf(%) (before solid Treatment) | tan δf(%) (after solid Treatment) | tan δ120(%) (after solid Treatment) |
|---|---|---|---|---|
| | 600° C. 1 Hr. | 0.2 | 0.2 | 1.3 |
| 100 | None | 1.1 | 1.5 | 2.5 |
| | 620° C. 1 Hr. | 0.25 | 0.25 | 1.3 |
| 120 | None | 1.2 | 1.5 | 2.4 |
| | 630° C. 1 Hr. | 0.35 | 0.35 | 1.2 |

As will be clearly seen from Table 1, each of the samples has a dielectric loss (tan $\delta_f$) of the oxide film as measured after the treatment in the atmospheric air. This loss is 0.2 to 0.35%, which is much smaller than the 1.1 to 1.4% observed in the samples having no heat treatment.

All of the ten samples shown in Table 1 were subjected to a process for forming a cathode of manganese dioxide through a thermal decomposition of manganese nitrate. These samples were formed into a solid by a resin dip following soldering by a use of a graphite and silver paste.

The dielectric loss (at 120 Hz) of the capacitor as a whole, including the ESR (Equivalent Series Resistance) of cathode resistance, such as of $MnO_2$ and the dielectric loss (tan $\delta_f$) of the oxide film was measured for each sample, the result of which is shown in the right column in Table 1.

Figure 2:
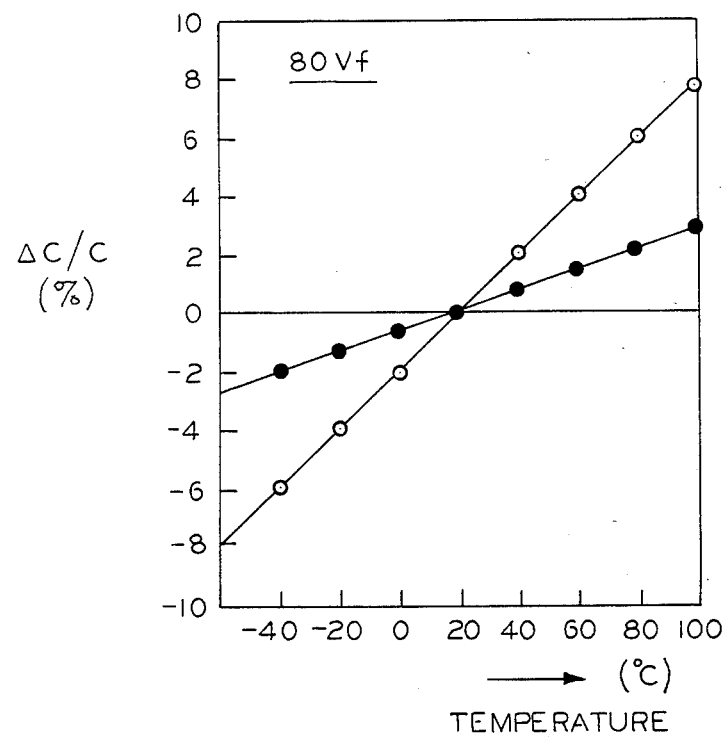
Figure 3:
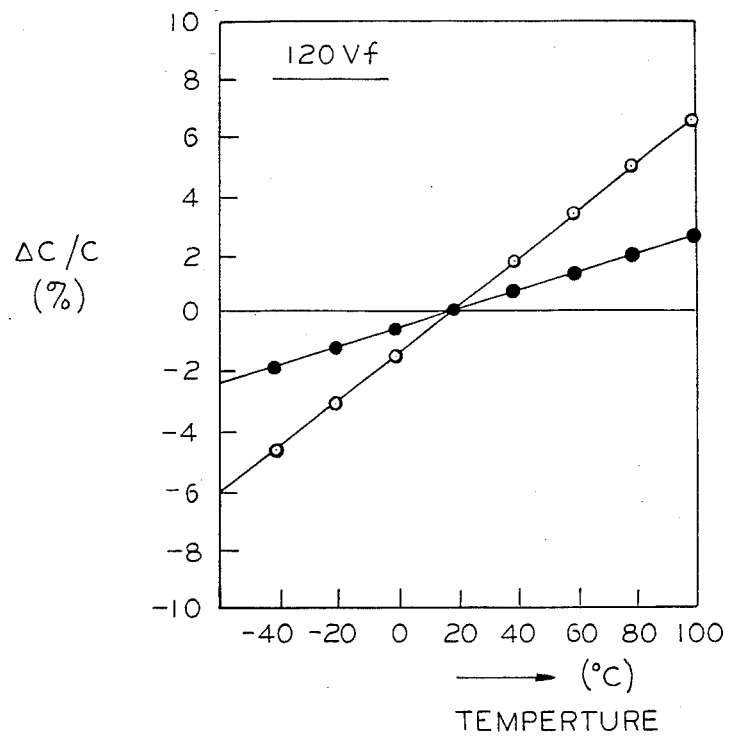

The temperature characteristics of the electrostatic capacitance (at 120 Hz) were measured for the solid samples obtained at oxidation voltages 40 Vf, 80 Vf and 120 Vf, within the temperature range between $-50°$ C. and $+100°$ C., the results of which are shown in FIGS. 1, 2 and 3. In these figures, each ordinate axis indicates the capacitance changing ratio normalized by the capacitance at 20° C., while each abscissa axis indicates the temperature. The curve plotted with the blank white circles shows the characteristics obtained with the solid samples formed directly after the anodic oxidation and without heat treatment. The curve plotted with the solid black circles shows the characteristics obtained with the solid samples formed after the heat treatment, at high temperature.

As will be understood from Table 1, the solid samples which were formed directly after the anodic oxidation, inherently showed an initial value of tan $\delta_f$ which is greater than the value exhibited by the samples which were subjected to the heat treatment at a high temperature. The solid samples obtained after the heat treatment maintained the initial small value of tan $\delta_f$ which was obtained before solidification. The temperature at which the manganese nitrate is thermally decomposed during the course of the solidification generally ranges between 200° C. and 250° C. At such a high temperature, the oxide film formed through the anodic oxidation (which is basically a low-temperature process) is thermally degraded. However, the oxide film once treated at high temperature does not exhibit any substantial degradation. The solid sample formed after the heat treatment also showed a smaller total value of tan $\delta$ (at 120 Hz) as the capacitor as a whole, corresponding to the small value of tan $\delta_f$.

The temperature characteristics of the electrostatic capacitance is seen from FIGS. 1-3. The solid samples formed after the heat treatment at high temperature (the curve plotted with solid black circles) exhibit a capacitance changing rate which is less than one-half of the rate obtained with the solid samples formed directly after the anodic oxidation (the curve plotted with blank white circles). This is true over the entire range of the measured temperature, thus proving a remarkable improvement. A greater improving effect is obtained as the oxidation voltage gets lower.

In the described embodiment, the heat treatment is conducted in the atmospheric air containing 21 vol. % of oxygen. It is confirmed that when the amount of oxygen in the treating atmosphere is less than 0.1 vol. %, no improvement is observed in the dielectric characteristics. By increasing the oxygen rate, the treating time is somewhat reduced. As a whole, a substantially equivalent effect is obtained if the treating atmosphere contains approximately 0.1 to 100 vol. % oxygen.

The optimum treating temperature varies depending on the oxidation voltage. As will be seen from Table 1, the temperature at which the value of tan $\delta_f$ is reduced is shifted to the higher side as the oxidation voltage gets higher, i.e., as the thickness of the oxide film gets large.

In the foregoing, the description has been made on the variation of the dielectric characteristics only as to restricted condition of the heat treatment to effectively show the effect of the present invention.

Next to be described is a more specific reason for the improvement of the dielectric characteristics, which is peculiar to an Al-Ti alloy.

Figures 4A, 4B:
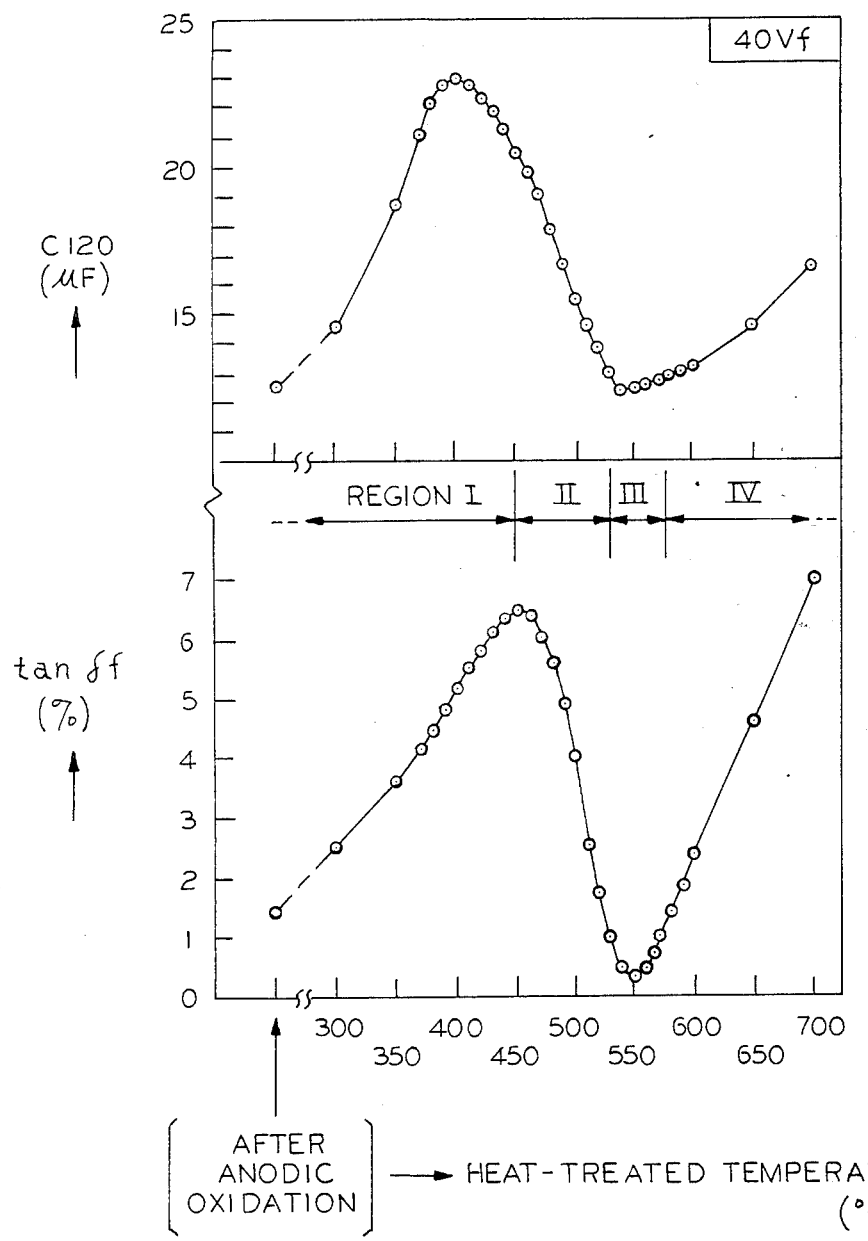
FIG. 4A shows a characteristic curve of electrostatic capacitances (at 120 Hz) of solid samples obtained at an oxidation voltage of 40 volts by changing heat-treated temperature.
FIG. 4B shows a characteristic curve of the dielectric loss of solid samples obtained at oxidation voltage of 40 volts by changing heat-treated temperature.

In FIG. 4, the variation of the dielectric characteristics is shown where Al-Ti alloy samples are subjected to a heat treatment in the temperature range of 300° C. to 700° C., for one hour after anodic oxidation with 40 volts. Each abscissa axis indicates the temperature while the ordinate axis of FIG. 4A indicates an electrostatic capacitance. The ordinate axis of FIG. 4B indicates a dielectric loss.

The variation of the dielectric characteristics against the temperature of the heat treatment can be divided into four regions I to IV. In region I, the dielectric loss increases monotonously according to the increase of the temperature. In FIG. 4B, the region I corresponds to the temperature range up to approximately 450° C.

In region II, tan $\delta_f$ decreases from peak value to the conventional level where no heat treatment is carried out. In FIG. 4B, the region II corresponds to the temperature range of approximately 450° C. to 550° C.

The region III shows the temperature range where the dielectric loss is lower than the conventional untreated loss. In FIG. 4B, the region III resides in the range of approximately 530° C. to 570° C. In the region III, the dielectric loss has a minimum value at 550° C. and then it increases again.

The region IV shows that the dielectric loss increases monotonously from the level of a conventional loss. In FIG. 4B, the region IV corresponds to the temperature range beyond approximately 570° C.

When the anodic oxidation film is treated, the oxygen in the oxide film is taken by the base metal (Al-Ti alloy). Due to an absence of oxygen, a donor level is formed in the portion of the oxide film near the boundary between the oxide film and the base metal, to form a semiconductive layer. As a consequence, a portion of the oxide film containing the boundary becomes conductive. Therefore, the effective thickness of the oxide film, as the insulator, is reduced, thereby increasing the tan $\delta_f$ value, as well as the electrostatic capacitance $C_{120}$. In region I, the oxide film is thermally degraded. Its degrading tendency becomes greater as the temperature gets higher, as shown in FIG. 4B.

When the temperature exceeds 450° C., the diffusion of the oxygen from the surface of the oxide film becomes active. Accordingly, an oxygen defect caused by the base metal is recovered by the activated oxygen diffusion, and $C_{120}$ and tan $\delta_f$ are reduced as shown in region II, in FIGS. 4A and 4B.

At a predetermined range of the temperature, a definite balance or equilibrium state is obtained between the oxygen taken into the base metal and diffused oxygen from the oxide film surface. As a result, the condition of oxide film is better than the condition of the untreated oxide film. Thus, a very small value of tan $\delta_f$ is obtained as shown in region III of FIG. 4B. The $C_{120}$ is returned to the initial value, as shown in FIG. 4B.

By futher increasing the temperature, the balance of the oxygen flows is deteriorated. The value of $C_{120}$ and tan $\delta_f$ is again increased, as shown in region IV.

As is apparent from the foregoing, the variation of both of tan $\delta_f$ and $C_{120}$ are once deteriorated, and again reduced after passing a maximum value. In region III, the minimum dielectric loss is obtained. The similar characteristic curves are observed in other samples which are obtained by other anodization voltages, by shifting the peak values. In Table 1, each temperature of the heat treatment for samples corresponds to the minimum value of tan $\delta_f$ within region III. From Table 1, it is apparent that, when the anodization voltages becomes larger, a desirable temperature to obtain the minimum dielectric loss is shifted toward a higher temperature. The reason may be assumed as follows. If the thickness of the oxide layer becomes larger, it requires a higher temperature to cause the diffusion effect from the surface of the oxide film to reach the boundary portion.

The smaller value of tan $\delta_f$ corresponds to the smaller value of the electrostatic capacitance temperature coefficient. Thus, the minimum condition of tan $\delta_f$ in region III corresponds to the needed condition of reduction and improvement of the above-mentioned temperature coefficient, as shown in FIGS. 1–3. In fact, when the heat treatment is done in regions I and II, the electrostatic capacitance temperature coefficient of the capacitor obtained by solidification shows a larger value than the value of the capacitor which is obtained by solidification without heat treatement shown in FIGS. 1–3, as plotted in blank white circles. For example, it is approximately twice the value of such blank white circle data of samples that is subjected to the heat treatment of 350° C. for one hour. That is, an improvement effect according to the present invention cannot be obtained in region I and II, rather, it results in the deterioration of the dielectric characteristics.

Accordingly, in order to obtain the excellent improvement effect of the dielectric characteristics, the condition of the heat treatment must reside in region III where the minimum value of tan $\delta_f$ appears in each of the suitable anodization voltages. In other words, the mere heat treatment in an oxygen atmosphere cannot give the effect of the present invention.

In general, the oxidiation voltage used in the production of electrolytic capacitors ranges between 30 volts and 150 volts, in most cases. With such an anodic oxidation voltage, appreciable effects of the reduction in the tan $\delta_f$ value and the electrostatic capacitance temperature coefficient can be obtained by selecting the region III in a heat treating temperature characteristics.

According to experimentation, when the anodic oxidation voltage is in the range of 30 to 150 volts, region III of the heat treatment corresponds to the temperature range of 500° C. to 700° C. An optimum temperature varies depending upon the anodic oxidation voltage. A higher temperature in the range of 500° C. to 700° C. is favorable for a higher anodic oxidation voltage in the range of 30 to 150 volts. The optimum condition obtains a minimum value of the dielectric loss. A heat treatment time ranges from thirty minutes to three hours depending upon the temperature. Under a higher temperature, in the range of 500° C. to 700° C., a heat treatment time may be shorter in the range of 0.5 to three hours. In a conventional Ta solid electrolytic capacitor, there is no region corresponding to regions II and III. As a matter of fact, a Ta anode body would burn if it was heated at 500°, or more, in the oxygen atmosphere. Accordingly, the existence of regions II and III is peculiar to the Al-Ti alloy.

With regard to the composition of Al-Ti alloy, it is desirable for the aluminum to be in a range of 50 to 70 atom %. This Al atom % range is effective for obtaining a high electrostatic capacity per unit volume. In view of a leakage current and dielectric loss, a porous body made of 54 to 60 atom % of aluminum compositions are favorable, as a capacitor anode. The optimum composition to manufacture the Al-Ti solid electrolytic capacitors is approximately 54 to 55 atom % of aluminum. The experiments showed that the composition of Al-Ti did not affect the characteristic curve of the dielectric loss against the heat treatment temperature.

As will be understood from the foregoing description of the embodiment, according to the production method of the invention, it is possible to remarkably decrease the electrostatic capacitance temperature coefficient, as well as the dielectric loss of the anodic oxide film, in an alectrolytic capacitor having an anode body made of an Al-Ti porous alloy, whereby a remarkable improvement is attained in the dielectric characteristics, thus proving a high utility and practicality of the invention.

Those who are skilled in the art will readily perceive how to modify the invention. Therefore, the appended claims are to be construed to cover all equivalent structures which fall within the true scope and spirit of the invention.

What is claimed is:

1. A method of producing an Al-Ti alloy solid electrolytic capacitor comprising steps of forming a porous Al-Ti alloy body, anodizing the Al-Ti alloy body to form an oxide layer onto said Al-Ti alloy body, and heating the anodized Al-Ti alloy body in an oxygen atmosphere at a temperature in the range of approximately 500° C. to 700° C.

2. A method of producing an Al-Ti alloy solid electrolytic capacitor as claimed in claim 1, in which said oxygen atmosphere is air.

3. A method of producing an Al-Ti alloy solid electrolytic capacitor as claimed in claim 1, in which said anodizing voltages ranges from about 30 volts to about 150 volts, and the temperature of said heating in the oxygen atmosphere is such that the dielectric loss of the heated oxide layer becomes lower than the initial dielectric loss of said oxide layer prior to said heat treatment.

4. A method of producing an Al-Ti alloy solid electrolytic capacitor comprising steps of mixing aluminum powder and a powder taken from the glass of titanium powder and titanium hydride powder, press-molding the mixture of said powders into a body, heating the resulting press-molded mixture for converting said body into a porous Al-Ti alloy body, forming an oxide layer onto said porous Al-Ti alloy body, thereafter heating the Al-Ti alloy body in an atmosphere containing at least 0.1 vol. % of oxygen at a temperature in the range of approximately 500° C. to 700° C., forming a manganese dioxide layer onto said oxide layer, and forming a cathode electrode layer onto said manganese dioxide layer.

5. A method of making a solid electrolytic capacitor comprising the steps of:
  (a) mixing powdered titanium and aluminum;
  (b) press molding the powder mixed in step (a) to form a body;
  (c) heating the press molded body to a sintering temperature to form a porous anode body;
  (d) subjecting the sintered body to an anodic oxidation;
  (e) heating the body to a temperature in the range of about 500° C. to 700° C. in an atmosphere containing at least 0.1 volumn % of oxygen; and
  (f) forming a cathode of manganese.

6. The method of claim 5 wherein the mean particle size of the powder mixed in step (a) is in the order of 3 μm.

7. The method of claim 6 wherein the ratio of aluminum and titanium mixed in step (a) is approximately 54 atom % aluminum and 46 atom % titanium.

8. The method of claim 5 wherein said pressed body formed in step (b) has a cylindrical shape.

9. The method of claim 8 wherein said cylindrical shape has dimensions which give a final body size of about 2.5 mm and a height of about 2 mm.

10. The method of claim 6 wherein the heating of step (b) is for a period of about 2 hours and at a temperature of about 1070° C., in a vacuum chamber.

11. The method of claim 6 wherein said anotic oxidation of step (d) is carried out in a solution which is about 1 vol. % of phosphoric acid, at a voltage in the range of about 40 V–120 V for a period of approximately one hour.

12. The method of claim 6 wherein said manganese cathode of step (e) is formed by a thermal decomposition of manganese nitrate to form manganese oxide, the thermal decomposition being carried out in the termperature range of about 200° C. to 250° C.

* * * * *